United States Patent
Kristensson et al.

(10) Patent No.: US 10,948,289 B2
(45) Date of Patent: Mar. 16, 2021

(54) SYSTEM AND METHOD FOR CALIBRATING SENSORS ACROSS LOOSELY COUPLED CONSUMER ELECTRONIC DEVICES

(75) Inventors: Andreas Kristensson, Sodra Sandby (SE); Magnus Abrahamsson, Loddekopinge (SE); Gunnar Klinghult, Lund (SE)

(73) Assignee: SONY CORPORATION, Tokyo (JP)

( * ) Notice: Subject to any disclaimer, the term of this patent is extended or adjusted under 35 U.S.C. 154(b) by 1181 days.

(21) Appl. No.: 13/549,293

(22) Filed: Jul. 13, 2012

(65) Prior Publication Data
US 2013/0116958 A1 May 9, 2013

Related U.S. Application Data

(60) Provisional application No. 61/555,269, filed on Nov. 3, 2011.

(51) Int. Cl.
*G01C 5/06* (2006.01)
*G01C 25/00* (2006.01)
*G01C 17/38* (2006.01)
*H04M 1/725* (2006.01)
(Continued)

(52) U.S. Cl.
CPC ............ *G01C 5/06* (2013.01); *G01C 17/38* (2013.01); *G01C 25/00* (2013.01); *H04B 5/0043* (2013.01); *H04B 5/0075* (2013.01); *H04M 1/04* (2013.01); *H04M 1/72527* (2013.01); *H04M 2250/12* (2013.01)

(58) Field of Classification Search
CPC .......... G01C 17/38; G01C 25/00; G01C 5/06; H04N 5/0043; H04N 5/0075; H04M 1/04; H04M 1/72527
See application file for complete search history.

(56) References Cited

U.S. PATENT DOCUMENTS

| | | |
|---|---|---|
| 2001/0022828 A1 | 9/2001 | Pyles |
| 2003/0115930 A1* | 6/2003 | Kappi ................ G01C 19/56 73/1.37 |

(Continued)

FOREIGN PATENT DOCUMENTS

| | | |
|---|---|---|
| EP | 1154231 A1 | 11/2001 |
| EP | 1310770 A1 | 5/2003 |
| EP | 1310770 B1 | 9/2009 |

OTHER PUBLICATIONS

Wikipedia: Bluetooth https://web.archive.org/web/20111004015739/https://en.wikipedia.org/wiki/Bluetooth retrieved by Archive.org on Oct. 4, 2011 (Year: 2011).*

(Continued)

*Primary Examiner* — Alexander Satanovsky
*Assistant Examiner* — Mark I Crohn
(74) *Attorney, Agent, or Firm* — Tucker Ellis LLP

(57) ABSTRACT

A base unit includes a sensor calibration function. When a user communicatively couples a consumer electronic device having a sensor to the base unit, a controller at the base unit retrieves a calibration reference value for the sensor and/or a sensor algorithm that utilizes data output by the sensor. The base unit then sends the calibration reference value to the consumer electronic device to set a sensor calibration parameter associated with the sensor and/or the sensor algorithm.

16 Claims, 9 Drawing Sheets

(51) Int. Cl.
*H04M 1/04* (2006.01)
*H04B 5/00* (2006.01)

(56) References Cited

U.S. PATENT DOCUMENTS

| | | | |
|---|---|---|---|
| 2005/0134581 A1* | 6/2005 | Hawkins | G06F 1/266 |
| | | | 345/211 |
| 2007/0214231 A1* | 9/2007 | Skinner | H04M 1/72525 |
| | | | 709/216 |
| 2007/0270721 A1 | 11/2007 | Ananny et al. | |
| 2009/0322548 A1 | 12/2009 | Gottlieb | |
| 2010/0144414 A1 | 6/2010 | Edis et al. | |
| 2010/0164297 A1* | 7/2010 | Kurs | H01Q 1/248 |
| | | | 307/104 |
| 2010/0194335 A1* | 8/2010 | Kirby | H02J 5/005 |
| | | | 320/108 |
| 2010/0201203 A1* | 8/2010 | Schatz | H01Q 7/00 |
| | | | 307/104 |
| 2010/0222648 A1* | 9/2010 | Tan | 600/301 |
| 2010/0289341 A1 | 11/2010 | Ozaki et al. | |
| 2011/0050164 A1* | 3/2011 | Partovi | H01F 5/003 |
| | | | 320/108 |
| 2011/0098087 A1* | 4/2011 | Tseng | 455/557 |
| 2011/0187318 A1* | 8/2011 | Hui | H02J 17/00 |
| | | | 320/108 |
| 2013/0193773 A1* | 8/2013 | Van Wageningen | 307/104 |

OTHER PUBLICATIONS

Wikipedia: MEI https://web.archive.org/web/20111018152550/https://en.wikipedia.org/wiki/Mobile_equipment_identifier retrieved by Archive.org on Oct. 18, 2011 (Year: 2011).*
Extended EP Search Report dated Aug. 23, 2016, for EP 12 007 217.8.

* cited by examiner

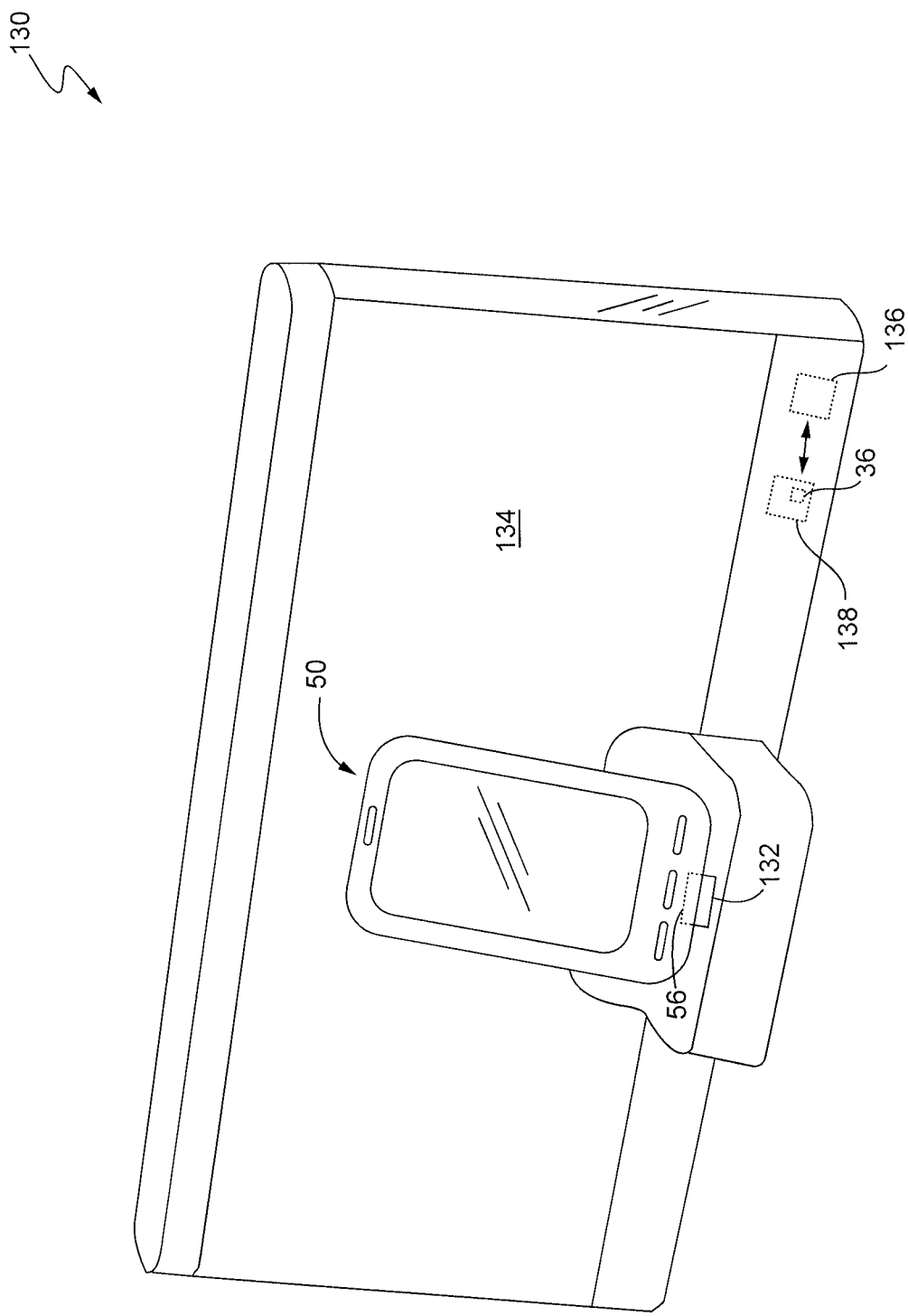

SYSTEM AND METHOD FOR CALIBRATING SENSORS ACROSS LOOSELY COUPLED CONSUMER ELECTRONIC DEVICES

RELATED APPLICATIONS

This application claims the benefits under 35 U.S.C. § 119(e) of U.S. Provisional Patent Application 61/555,269, filed Nov. 3, 2011, which is incorporated herein by reference.

FIELD OF THE INVENTION

The present invention relates generally to calibrating sensor devices, and more particularly to a system and method for calibrating sensors distributed across one or more consumer electronic devices.

BACKGROUND

There are many different types of communication devices currently available. However, one particular type of device presently enjoying an astounding increase in popularity is the Smartphone. One of the reasons for this popularity is that the Smartphone provides functionality that far exceeds that provided by a simple communications device. Particularly, Smartphones generally utilize a touch-sensitive display to allow their users to interact directly with one or more computer applications stored in memory on the device.

One particularly useful application is a navigation application. Specifically, most Smartphones have an integrated Global Positioning Satellite (GPS) receiver for receiving navigational signals from a plurality of satellites. Based on these signals, the Smartphone can calculate its current position almost anywhere on the Earth's surface and display that position to the user on a touch-sensitive display. Further, given the current location, the application can calculate a route to a destination location for the user.

Historically, GPS applications were limited by the need to be within the "line-of-sight" of multiple satellites. Therefore, while a GPS application may provide an accurate position fix before the user enters a building, it is difficult for the GPS application to determine the user's position after the user enters the building. The difficulties in providing an accurate indoor position fix can be amplified depending on various factors, such as the construction of the building. Thus, with some GPS applications, it is almost impossible to accurately determine what floor the user is on, as well as whether the user is a particular room or part of the building.

To address such situations, manufacturers have started integrating a variety of different sensors into their Smartphone devices. One such sensor is a pressure sensor. Generally, pressure sensors are Microelectromechanical System (MEMS) devices that measure changes in atmospheric pressure. With a pressure sensor, a given GPS application may be able to differentiate changes in altitude of less than 1 meter. Thus, a Smartphone equipped with a GPS application and a pressure sensor can be used to determine which floor of a multi-story building that a user is currently occupying.

Additionally, pressure sensors can be placed into different items or devices that are wearable by people, such as headsets, jewelry, head gear, watches, and so-called "smart" clothing, and used to track their positions within a building. Further, in addition to pressure sensors, other types of sensors, such as a magnetometer, an accelerometer, and/or a gyroscope, may also be integrated within the Smartphone or other device and utilized by the GPS application to estimate a person's location within the building (e.g., within a specific room), or to facilitate the functions of gaming applications, bio or chemo sensor applications, or communications applications, for example.

Thus, sensors have many different uses and may be integrated into many different types of devices; however, whatever their use or function, the sensors need not be contained within any one single item or device, such as the Smartphone. Instead, the sensors may be distributed across different items and devices. However, to ensure that the sensors and the sensor algorithms that use the sensor data function accurately, the sensors must be calibrated. Sensor calibration can be quite difficult, especially where the sensors are distributed across different items and/or devices.

SUMMARY

The present invention provides a system and method for calibrating sensors that are integrated into electronic devices, such as cellular telephones. In one embodiment, a method of setting a sensor calibration parameter for a sensor in a consumer electronic device comprises communicatively coupling a base unit to a first consumer electronic device having a sensor, and setting a sensor calibration parameter of the sensor while communicatively coupled to the first consumer electronic device.

In one embodiment, setting a sensor calibration parameter comprises sending a calibration reference value for the sensor calibration parameter to the first consumer electronic device.

In one embodiment, the base unit comprises a battery charger configured to send the calibration reference value to the first consumer electronic device via an electrical connection electrically the battery charger to the first consumer electronic device.

In one embodiment, the base unit comprises a wireless charging platform configured to wirelessly transmit the calibration reference value to the first consumer electronic device via a wireless communications link.

In one embodiment, the base unit comprises a dock configured to send the calibration reference value to the first electronic device via an electrical connection coupling the battery charger to the first consumer electronic device.

In one embodiment, the method further comprises receiving the calibration reference value as user input.

In one embodiment, the method further comprises receiving data transmitted by the first consumer electronic device while the first consumer electronic device is communicatively coupled to the base unit, and obtaining the calibration reference value based on the received data.

In one embodiment, obtaining the calibration reference value based on the received data comprises retrieving the calibration reference value from a memory at the base unit.

In one embodiment, obtaining the calibration reference value comprises retrieving the calibration reference value from a network server via a communications interface at the base unit.

In one embodiment, the method further comprises communicatively coupling the sensor calibration function to a second consumer electronic device having a sensor, reading a calibration reference value from the second consumer electronic device, and setting the sensor calibration parameter of the sensor in the first consumer electronic device based on the calibration reference value read from the second consumer electronic device while communicatively coupled to the second consumer electronic device.

In one embodiment, setting a sensor calibration parameter comprises sending a calibration reference value to set the sensor calibration parameter of a sensor algorithm that operates on data output by the sensor to the first consumer electronic device.

The present invention also provides an apparatus configured to perform the method of the invention. In one embodiment, the apparatus comprises a base unit having a sensor calibration function. The base unit comprises a base configured to communicatively couple to a first consumer electronic device having a sensor, and a controller configured to set a sensor calibration parameter of the sensor while communicatively coupled to the first consumer electronic device.

In one embodiment, the controller is configured to set the sensor calibration parameter by sending a calibration reference value to the first consumer electronic device.

In one embodiment, the base unit comprises a battery charger configured to send the calibration reference value to the first consumer electronic device via an electrical connection electrically connecting the battery charger to the first consumer electronic device.

In one embodiment, the base unit comprises a wireless charging platform having a wireless transceiver, and wherein the controller is further configured to transmit the calibration reference value to the first consumer electronic device via the transceiver.

In one embodiment, the base unit comprises a dock, and wherein the controller is further configured to send the calibration reference value to the first consumer electronic device via an electrical connection connecting the dock to the first consumer electronic device.

In one embodiment, the base unit further comprises a user interface configured to receive the calibration reference value as user input.

In one embodiment, the controller is further configured to receive data transmitted by the first consumer electronic device, and obtain the calibration reference value based on the received data.

In one embodiment, the base unit further comprises a communications interface connecting the base unit to a network server, and wherein the controller is further configured to retrieve the calibration reference value from the network server.

In one embodiment, the base unit is further configured to communicatively couple to a second consumer electronic device having a sensor. In such embodiments, the controller is further configured to read a calibration reference value from the second consumer electronic device, and set the sensor calibration parameter at the first consumer electronic device based on the calibration reference value.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

FIG. 8 is a perspective view of a media dock configured to render media files stored on a consumer electronic device, and to calibrate a sensor at the device according to one embodiment of the present invention.

DETAILED DESCRIPTION

Figure 1:
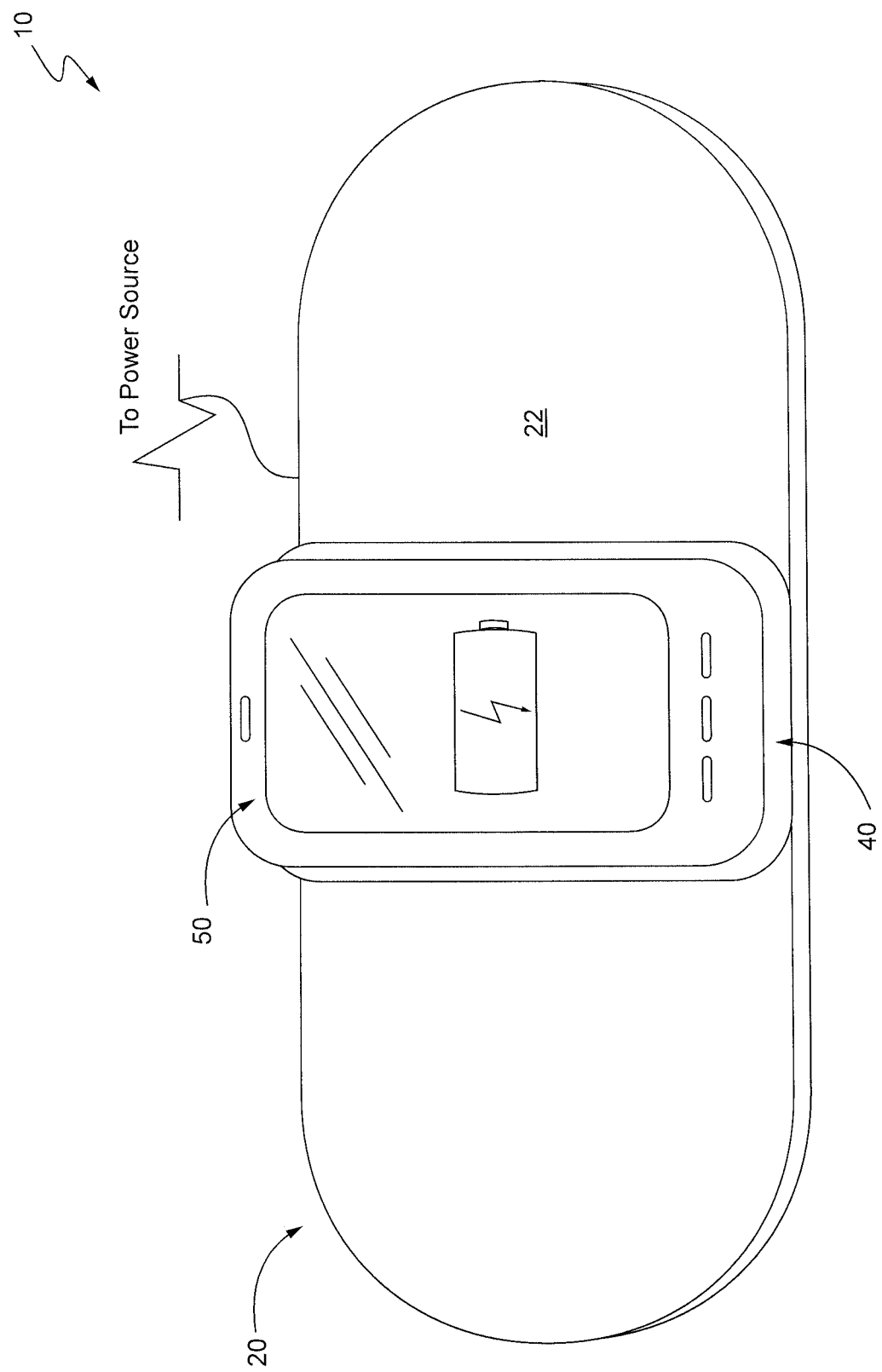
FIG. 1 is a perspective view of a base unit configured as a wireless charger that charges the batteries of a consumer electronic device and calibrates its sensors according to one embodiment of the present invention.

The present invention provides a sensor calibration function for a base unit for calibrating sensors associated with one or more consumer electronic devices, as well as the sensor algorithms that utilize data output by the sensors, while the devices are communicatively coupled to the base unit (i.e., while the devices are positioned on or electrically connected to the base unit such that the consumer electronic devices and the base unit can communicate data). More particularly, the base unit is configured to perform some intended conventional function, such as charge a battery at the device or render music/video stored at the device. In addition, however, the sensor calibration function sends one or more reference values to the consumer electronic device while the device is communicatively coupled to the base unit. Upon receipt, the consumer electronic device uses the reference values to calibrate one or more sensors associated with the device, and/or the sensor algorithms that use the data output by such sensors.

The ability to set the sensor calibration parameters at the electronic device in this manner helps to ensure that the sensors and the sensor algorithms associated with that device are calibrated. For example, many cellular telephones, such as Smartphones, have Global Positioning Satellite (GPS) receivers that provide location and navigation services to users. Additionally, many Smartphones and/or their accessories (e.g., a headset) also have a pressure sensor to measure a user's altitude at a given location. Readings from the pressure sensor extend the functionality of a GPS application executing on the device such that a user may be located on, or navigated to/from, a particular floor of a multi-floor building. Similarly, other types of sensors (e.g., magnetometers, electronic compasses, accelerometers, gyroscopes, etc.) integrated into the Smartphone or other device provides functionality for games and other applications.

To operate properly, a sensor and/or an algorithm that utilizes the data output by the sensor should be accurately calibrated. However, such calibration can be difficult. This is especially true when one must calibrate multiple sensors, or their associated algorithms, integrated into a plurality of different devices. Therefore, the base unit configured according to the present invention calibrates sensors in different devices in addition to performing its intended conventional function. By way of example only, the base unit may comprise a battery charger that charges the batteries of the devices, or a media dock that renders multimedia files stored on the device. In either case, both the battery charger and the media dock are configured, according to one embodiment of the present invention, to set one or more sensor calibration parameters of one or more sensors at the devices while communicatively coupled to the devices. In another embodiment, the battery charger and the media dock are configured to set one or more calibration parameters of the sensor algorithms at the devices that use the data from the sensors while communicatively coupled to the devices.

Turning now to the drawings, FIG. 1 is a perspective view of a base unit configured according to one embodiment of the present invention. As seen in FIG. 1, the wireless charging system 10 is configured to charge a battery of a consumer electronic device, such as a cellular telephone 50, as well as set calibration parameters of one or more sensors, and/or the sensor algorithms that use the sensor data, that are associated with one or more such a device. To that end, system 10 comprises a wireless charger 20 and a receiver unit 40 that is not physically connected to the wireless charger 20 (e.g., using cabling or wires). The wireless charger 20 comprises a base having a substantially flat surface referred to herein as a charging platform 22, and connects to an external source of power (not shown) such as an electrical outlet. As is known in the art, the wireless charger 20 generates a charging voltage from this external power source to charge a battery in the cellular telephone 50.

The system 10 can utilize any of a variety of well-known technologies to charge the battery. For example, in one embodiment of the present invention, the system 10 employs electromagnetic induction to charge the battery of cellular telephone 50. With electromagnetic induction, circuitry in the wireless charger 20 generates a powerful electromagnetic field at a particular frequency from the power provided by the external power source. The receiver unit 40, which lies directly on the charging platform 22 and is electrically coupled to the charging circuit in cellular telephone 50, uses the electromagnetic field to generate an electrical current. The receiver unit 40 then provides the generated current to the charging circuit in the cellular telephone 50 to charge the battery in cellular telephone 50.

There are, of course, other equally suitable and well-known technologies by which system 10 can charge the battery of cellular telephone 50. These include, but are not limited to, "radio reception" and "resonance." With "radio reception," the wireless charger 20 transmits a wireless signal to the receiver unit 40. Upon receipt of the signal, well-known processing circuitry at the receiver unit 40 generates the charging current from the received wireless signals and transfers the charging current to the cellular telephone 50 to charge the battery. "Resonance" combines elements of both the electromagnetic induction and radio reception methods to generate the charging current. Specifically, the wireless charger 20 and the receiver unit 40 each have a coil tuned to the same frequency, with the coil in the charging platform attached to the power source. When the receiver unit 40 is brought near the wireless charger 20, energy is produced because the coils are tuned to the same frequency. This energy is then transferred to the receiver unit 40, which generates the charging current used to charge the battery of cellular telephone 50.

According to the present invention, the wireless charger 20 is not solely used to charge batteries. Rather, the wireless charger 20 is provided with components and functions to allow a user to easily set the calibration parameters of one or more sensors integrated into one or more electronic devices with minimal user interaction. The present invention is especially beneficial, as will be seen in more detail later, for setting the calibration parameters of multiple like sensors integrated or associated with other electronic devices.

Figure 2:
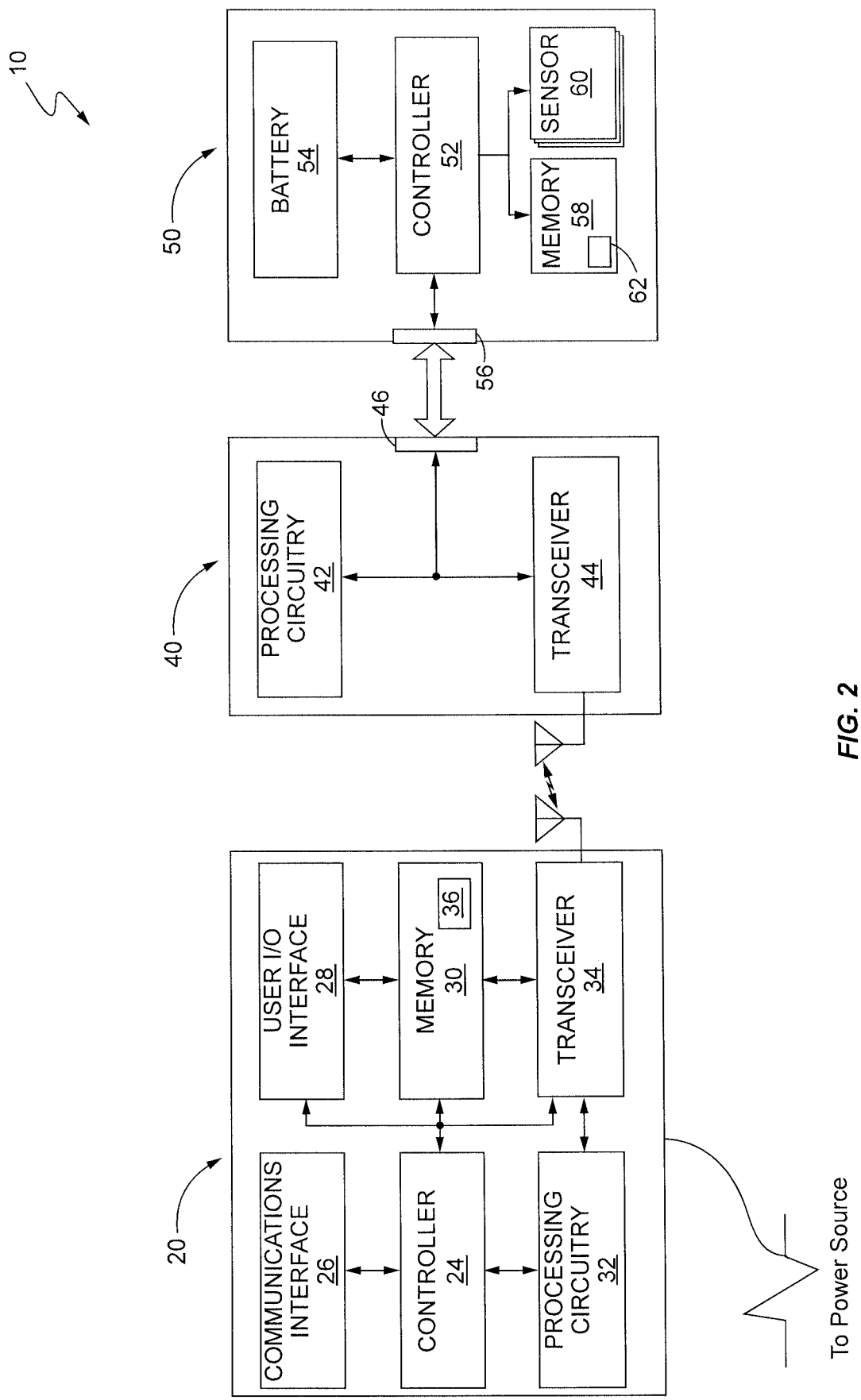
FIG. 2 is a block diagram illustrating some of the components of a wireless charging system configured according to one embodiment of the present invention.

FIG. 2 is a block diagram illustrating some of the components in an exemplary system 10 configured according to one embodiment of the present invention. As seen in FIG. 2, the wireless charger 20 comprises a programmable controller 24, a network communications interface 26, a user Input/Output (I/O) interface 28, a memory 30, processing circuitry 32, and a transceiver 34.

The controller 24 comprises one or more programmable microprocessors configured to control the user wireless charger 20 according to logic and instructions stored in memory 30. Such control includes the control of conventional functions, such as user I/O, communications, and battery charging functions; however, it also includes the control over non-conventional functions of the wireless charger 20, such as the retrieval, storage, and transmission of a calibration reference value used for setting a sensor calibration parameter for one or more sensors integrated at respective electronic devices, such as the cellular telephone 50, and/or the sensor algorithms that use the data output by such sensors.

The controller 24 may be configured to retrieve the calibration reference value from any of a variety of different sources. In one embodiment, for example, the calibration reference value is stored at a network server (not shown). In such embodiments, the controller 24 communicates with the network server via the communications interface 26 using well-known protocols. Based on information and data provided to the controller 24, as described in more detail below, the controller 24 can retrieve a desired calibration reference value from the network server and transmit the value to the cellular telephone 50 via the receiver unit 40 to set the sensor calibration parameter of the sensor, or a sensor algorithm, at the cellular telephone 50.

In another embodiment, the user can enter the calibration reference value as user input via the user interface 28. In these embodiments, the user interface 28 may include a display and an input interface (e.g., a keypad or a touch-sensitive display), for example, to allow the user to interact with the wireless charger 20. In these embodiments, the controller 24 may display one or more prompts to the user to enable the user to enter the calibration reference value. For example, the prompts may display helpful information, such as data identifying the cellular telephone 50 and/or a sensor to be calibrated, to assist the user in providing the appropriate values. Alternatively, or in addition, the prompts may display information and data that allows the user (or the wireless charger 20) to retrieve the desired calibration reference values from the network server via the communications interface 26. However the wireless charger 20 obtains the values, controller 24 may store the values in memory 30, and/or transmit the values to the cellular telephone 50 via the receiver unit 40 to set the sensor calibration parameters.

Memory 30 is a computer readable medium representing the entire hierarchy of memory in the wireless charger 20. Memory 30 may comprise both random access memory (RAM) and read-only memory (ROM), and may be implemented, for example, as one or more discrete devices, stacked devices, or removable devices, such as a flash drive or memory stick, or may be integrated with controller 24. Computer program instructions and data required for operating the wireless charger 20 according to the present invention may be stored in non-volatile memory, such as EPROM, EEPROM, and/or flash memory. These include, but are not limited to, the network communications functions and the user I/O interface functions previously described.

The logic and instructions stored in memory 30 are also capable of controlling the controller 24 to set sensor calibration parameters at the cellular telephone 50 while it is on the charging platform 22. More specifically, a sensor calibration function 36 stored in memory 30, when executed by the controller 24, may control the controller 24 to retrieve the calibration reference values as discussed previously. Thereafter, the sensor calibration function 36 could control the controller 24 to transmit the calibration reference values to set one or more corresponding sensor calibration parameters for the sensor, or the sensor algorithms that use the sensor output, at the cellular telephone 50.

The processing circuitry 32 includes the components necessary for generating and regulating the charging current used to charge the battery of the cellular telephone 50. The transceiver 34, which may be a well-known Near Field Communication (NFC) transceiver, for example, emits the charging current used to charge the cellular telephone 50. In addition, transceiver 34 also transmits the calibration reference values to the receiver unit 40 for use in setting the sensor calibration parameters at the cellular telephone 50. Generally, the transmissions need only travel over a distance of a couple of centimeters, but may, in some embodiments, propagate through open space for several meters.

The receiver unit 40 comprises processing circuitry 42, a transceiver 44 that corresponds to the transceiver 34 of wireless charger 20, and an interface 46 that electrically connects the cellular telephone 50 to the receiver unit 40. The signals transmitted by the transceiver 34 at wireless charger 20, regardless of whether those signals are used as a charging current, or for setting the calibration parameters of the sensor, are received by the transceiver 44. The processing circuitry 42 processes the received signals using well-known circuitry, and generates the appropriate charging current that is sent to the cellular telephone 50 via interface 46. The calibration reference values, upon receipt by the transceiver 44, are sent to the cellular telephone 50 via interface 46 for use in setting the sensor calibration parameters.

The cellular telephone 50 comprises, inter alia, a programmable controller 52, a rechargeable battery 54, an interface 56 that electrically connects the cellular telephone 50 to the receiver unit 40, a memory 58, and one or more sensors 60. The sensor 60 may comprise, for example, a pressure sensor configured to detect a current altitude for the cellular telephone 50. Specifically, the cellular telephone 50 may include a GPS receiver and a corresponding application to allow the user of cellular telephone 50 to determine a current location, or to determine a travel route to a destination location. Historically, such applications could only provide a user with information regarding where on the Earth's surface he or she was located. With data provided by pressure sensor 60, however, the application can also determine the altitude of the user.

However, as previously stated, the sensor 60, and/or the sensor algorithms that utilize the sensor data, must be properly calibrated to accurately determine a user's location in three dimensions. Thus, certain sensor parameters may be assigned values from time to time. Although the values may be any values needed or desired, the calibration values in one embodiment of the present invention include a reference pressure value and/or a reference height above sea level. As seen in FIG. 2, the cellular telephone 50 may store its calibration values 62 in memory 58.

Figure 3A:
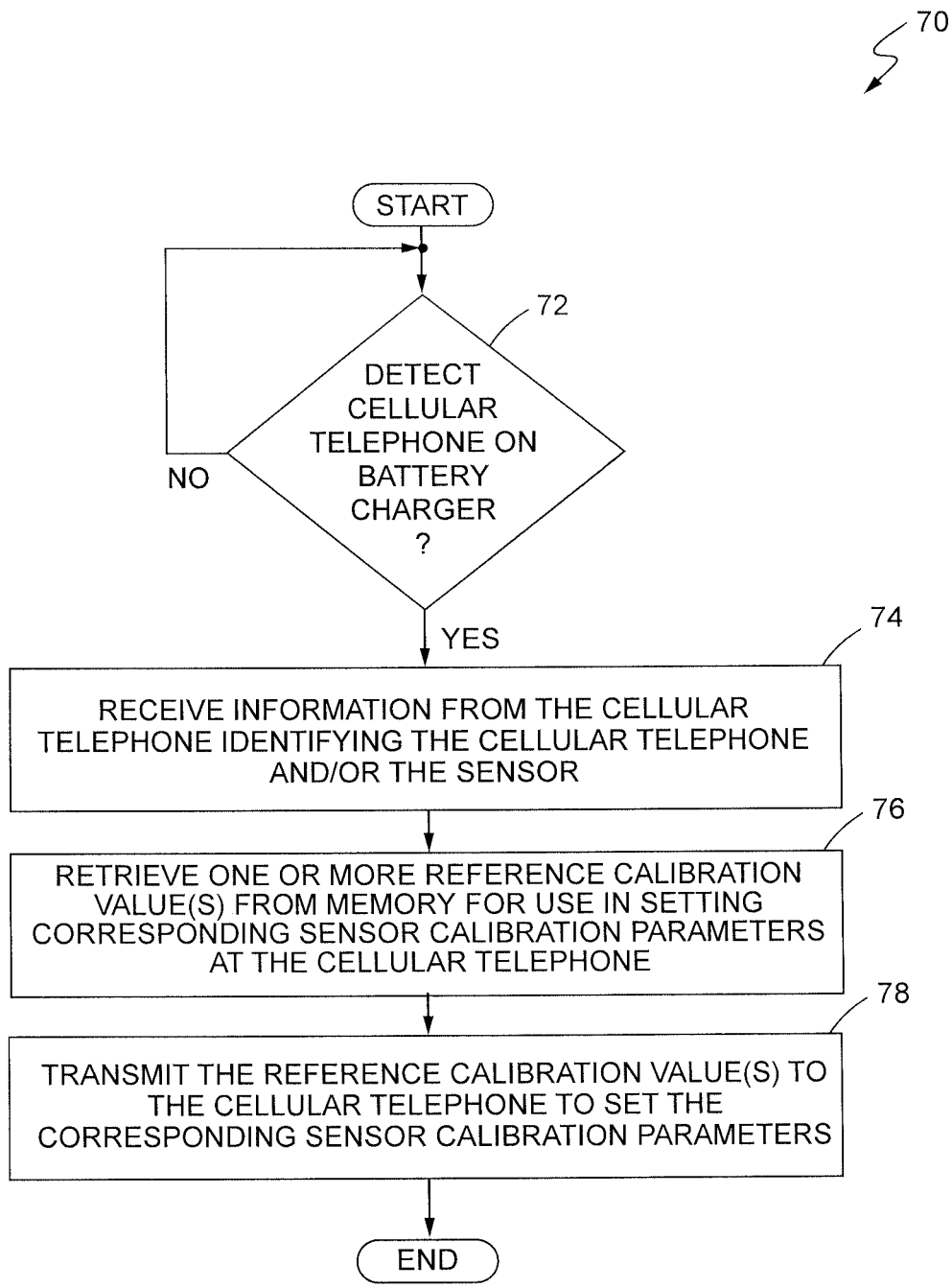
FIG. 3A is a flow diagram illustrating a method performed at a battery charger for providing reference values to set the calibration parameters of one or more sensors at a consumer electronic device according to one embodiment of the present invention.

FIG. 3A is a flow diagram illustrating a method 70 for setting the calibration parameters at cellular telephone 50 according to one embodiment of the present invention. In this embodiment, the sensor 60 comprises a pressure sensor, and the specific parameter being set is a reference height above sea level. Further, the device that houses sensor 60 is illustrated as being cellular telephone 50. However, as stated previously, those skilled in the art will readily appreciate that this is for illustrative purposes only. Sensor 60 may comprise any desired sensor, such as a magnetometer, an accelerometer, and a gyroscope, for example, and be calibrated according to any desired sensor calibration value. Additionally, the device or item that contains sensor 60 need not comprise a cellular telephone. As seen in more detail later, the cellular telephone 50 may comprise another different item or device including, but not limited to, a watch, a headset, or tablet computing device, for example.

Method 70 begins with the wireless charger 20 detecting that a user has placed cellular telephone 50 on the charging platform 22 for charging (box 72). Such detection may be accomplished in any known manner. However, in one embodiment, the user electrically couples the cellular telephone 50 to the receiver unit 40, and then places the receiver unit 40 onto the charging platform 22. Both the wireless charger 20 and the receiver unit 40 have corresponding Near Field Communication (NFC) transceivers 34, 44. As is known in the art, these types of transceivers can detect each other when placed in close proximity to each other.

More particularly, Near Field Communication is a well-known short-range wireless connectivity technology that uses magnetic field induction to permit devices to share information with each other. Typically, NFC devices operate at a frequency of 13.56 MHz and may transfer data at rates up to 424 Kbs; however, data transfer rates of up to 2 Mbps and above may be possible. Communication between two NFC-capable devices, such as the wireless charger 20 and the receiver unit 40, occurs when they are brought into contact with each other, or within close physical proximity of one another. Typically, the distance separating two NFC-capable devices can be anywhere between about 0 and 4 centimeters; however, the distance can be up to about 20 centimeters.

In the present embodiment, the transceivers 34, 44 detect each other when the user places the cellular telephone 50 (electrically coupled to the receiver unit 40) in operative charging contact with the wireless charger 20 (i.e., on the charging platform 22). When placed on the platform 22, the controller 52 sends information identifying the cellular telephone 50 and the sensor 60 to the wireless charger 20 via transceiver 44 in the receiver unit 40 (box 74). The exchange of data and information may be accomplished using any known method, however, in one embodiment, the controller 24 at the wireless charger 20 generates and sends a request message to the cellular telephone 50 via receiver unit 40 responsive to the transceiver 44 detecting transceiver 34 (i.e., when the user places the cellular telephone 50 in the receiver unit 40 on the charging platform 22). The request message is sent to the controller 52, which then accesses memory 58 to retrieve the requested information and returns the requested information to the controller 24 via the receiver unit 40 in a response message. The information may comprise, for example, a Mobile Equipment Identifier (MEI) or a telephone number, and/or an identifier or other unique indicator associated with the sensor integrated in the cellular telephone 50. The receiver unit 40 then forwards this data and information to the wireless charger 20 via NFC link established between the two transceivers 34, 44.

Upon receipt of the identifying information, the controller 24 at the wireless charger 20 executes a look-up function to retrieve the appropriate reference calibration value for the identified sensor 60 from the memory 30 (box 76). For example, the controller 24 may use the MEI and/or the sensor code as an index into a table of reference values, and select the corresponding reference calibration value for that particular sensor 60. The controller 24 will then set the sensor calibration parameter at the cellular telephone 50 to calibrate the sensor 60 (box 78). For example, while the cellular telephone 50 is on the charging platform 22, the controller 24 may control the transceiver 34 in the wireless charger 20 to transmit the reference calibration value retrieved from the memory 30 to the receiver unit 40. In turn, the receiver unit 40 will send the reference calibration value to the controller 52 in the cellular telephone 50, which will set the sensor calibration parameter using the received value and calibrate the sensor 60.

In the embodiment of FIG. 3A, the controller 24 executed a look-up function to retrieve a reference calibration value for sensor 62 from memory based on information received from the cellular telephone 50. However, the present invention is not so limited. As previously described, the controller 24 may also generate a query (e.g., a request message) to retrieve the desired reference calibration value(s) from a network server via communication interface 26, or obtain the reference calibration value(s) from the user via user interface 28.

Figure 3B:
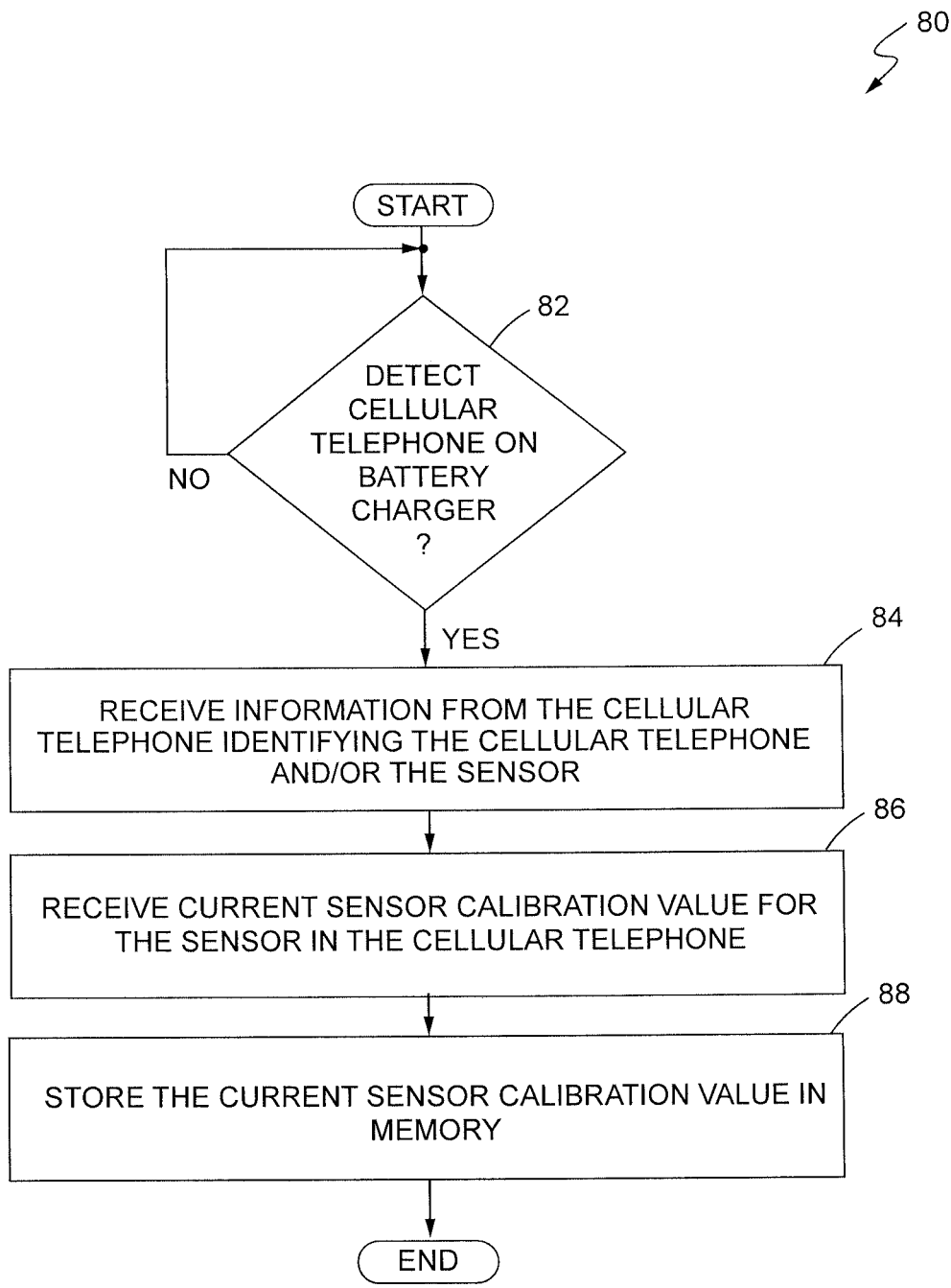
FIG. 3B is a flow diagram illustrating a method performed at a battery charger for receiving one or more calibration values from a consumer electronic device being charged for storage in memory according to one embodiment of the present invention.

In addition, the wireless charger 20 may also obtain a reference calibration value from an electronic device that is currently on the charging platform 22. FIG. 3B illustrates such an embodiment. Particularly, the cellular telephone 50 (or other device or item containing the sensor 60) provides a current reference calibration value to the wireless charger 20 for storage in the memory 30. Obtaining a current reference value for storage at the wireless device 20 may be beneficial in cases where a sensor may need re-calibration, as may occur from time to time. Specifically, with the values in memory 30, the wireless charger 20 could simply use the saved values to set or re-set the sensor calibration values at the cellular telephone 50, as needed or desired. Also, as seen in more detail below, it allows a user to set the calibration parameters of multiple like sensors using a common reference value. This helps to ensure that all electronic devices using the same type of sensor, which may be part of a larger, loosely coupled system, are calibrated similarly.

As seen in FIG. 3B, method 80 begins when the cellular telephone 50, in the receiver unit 40, is placed on the wireless charging platform 22 (box 82). In response, the transceiver 44 at the receiver unit 40 will transmit the identification information associated with the cellular telephone 50 and/or the sensor 60 to the controller 24 at the wireless charger 20 (box 84). The receiver unit 40 will also transmit the reference calibration values 62 extracted from memory 58 to the wireless charger 20 (box 86). Upon receipt of the information, the controller 24 will update memory 30 to store the received information and reference calibration values (box 88). As previously stated, these functions occur while the cellular telephone 50 is on the charging platform 22.

Figure 4:
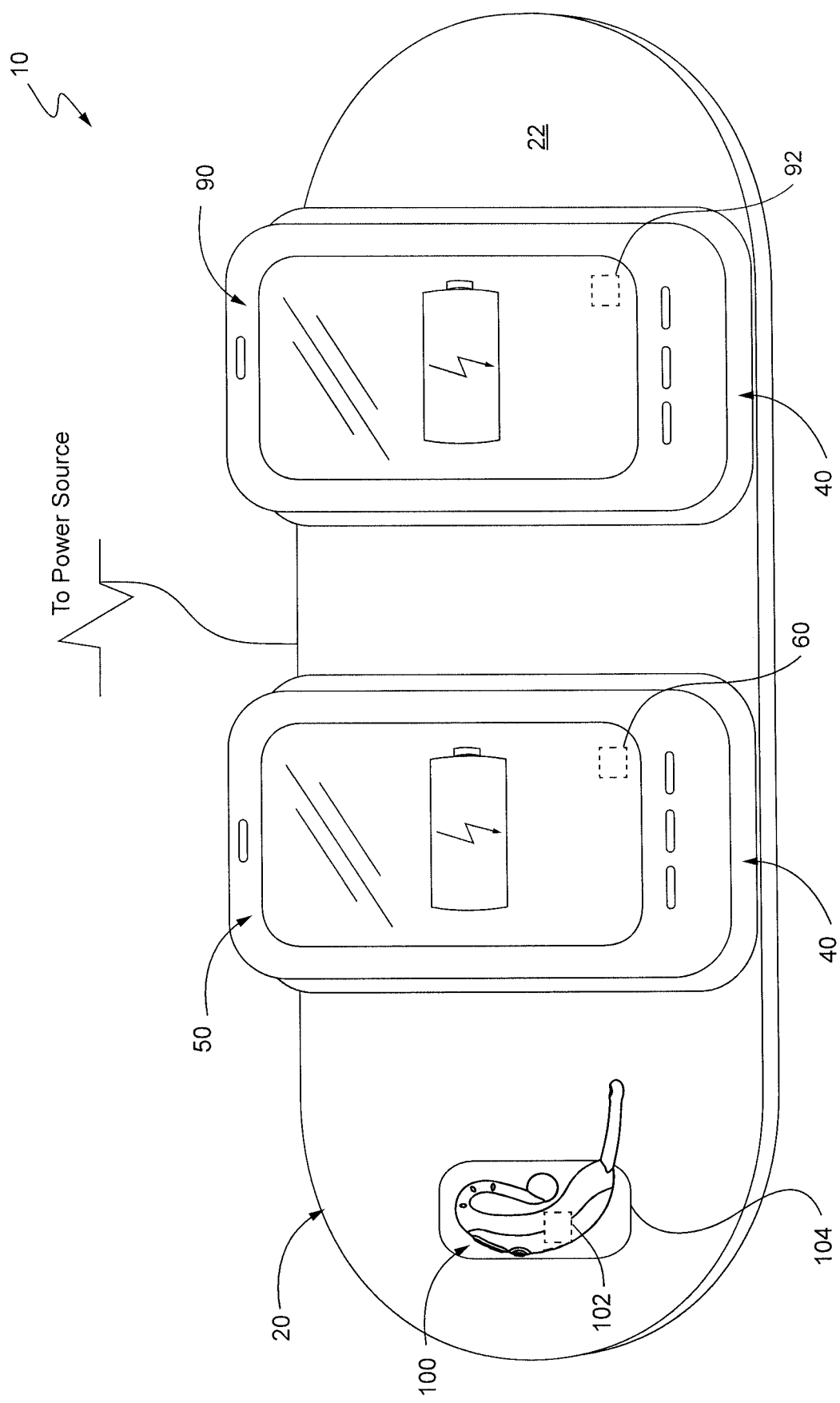
FIG. 4 is a perspective view of a wireless charger configured to charge multiple electronic devices and to calibrate their respective sensors according to one embodiment of the present invention.

FIG. 4 is a perspective view illustrating an embodiment wherein a first electronic device (e.g., cellular telephone 50) provides a current calibration value for its sensor 60 to the wireless charger 20 for use as a calibration reference value in setting a sensor calibration parameter of a sensor 92 at a second electronic device 90 (e.g., another cellular telephone), and/or a sensor 102 at a third electronic device 100 (e.g., a wireless headset). As seen in FIG. 4, the cellular telephone 90 and sensor 92 are similar to the cellular telephone 50 and sensor 60, respectively, seen in previous embodiments. Thus, a user would electrically couple each cellular telephone 50, 90 to its respective receiver unit 40, and place both devices in operative charging contact with the charger 20 (i.e., on the charging platform 22). The wireless headset 100 would have its own receiver unit 104, but is also placed in operative contact with the wireless charger 20. Once the devices 50, 90, 100 are on the charging platform 22, wireless charger 20 would then read the current reference calibration value(s) from the memory of one of the devices (e.g., cellular telephone 50) and use that value to set the calibration parameter of the other device(s) 90, 100. Such functions are useful for cases where a cellular telephone 50 was recently calibrated at another location, and thus, can now be utilized to calibrate other devices.

Figure 5:
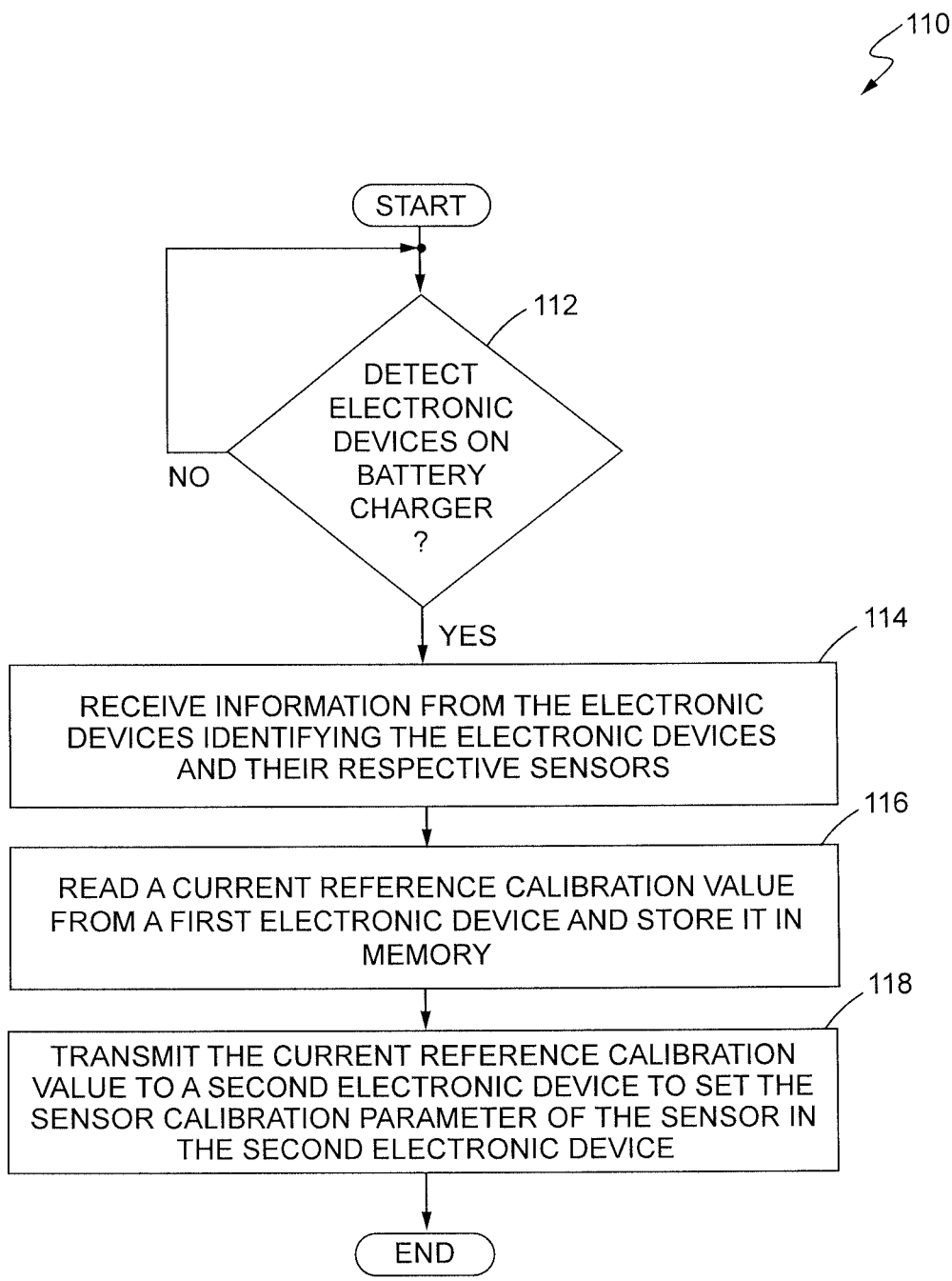
FIG. 5 is a flow diagram illustrating a method performed at a battery charger for using the calibration values of one consumer electronic device to set the sensor calibration parameters of one or more other consumer electronic device(s) according to one embodiment of the present invention.

FIG. 5 illustrates one embodiment wherein a current sensor calibration value for pressure sensor 60 is read from the cellular telephone 50 and used as a calibration reference value for a pressure sensor 92 in cellular telephone 90. Those skilled in the art will appreciate that the description of the method in FIG. 5 using two cellular telephones 50, 90 is illustrative only, and that the method may be performed to set the calibration parameters of the sensors in one or more different electronic devices (e.g., headset 100, or a watch, clothing, etc.) as needed or desired.

Method 110 begins when the user places the cellular telephones 50, 90 in their respective receiver units 40 and onto the platform 22 (box 112). Once on the charging platform 22, the receiver units 40 transmit information and data identifying each device 50, 90 as well as their respective sensors 62, 92, to the wireless charger 20 (box 114). The transmissions may be responsive, for example, to a request message generated and sent by controller 24 in wireless charger 20 as previously described. The receiver unit 40 associated with the cellular telephone 50 then receives a current sensor calibration value from the cellular telephone 50 via the interfaces 46, 56, and transmits that value to the wireless charger 20 (box 116). Upon receipt, the controller 24 at the wireless charger 20 may store the value in memory 30, as previously described. However, according to one embodiment, controller 24 may also utilize that value to set a sensor calibration parameter of sensor 102. Particularly, the controller 24 may transmit the value received from the cellular telephone 50 to the cellular telephone 90 to set the sensor calibration parameter of the sensor 92 while the cellular telephone 90 is on the charging platform 22 (box 118) and being charged.

Figure 6:
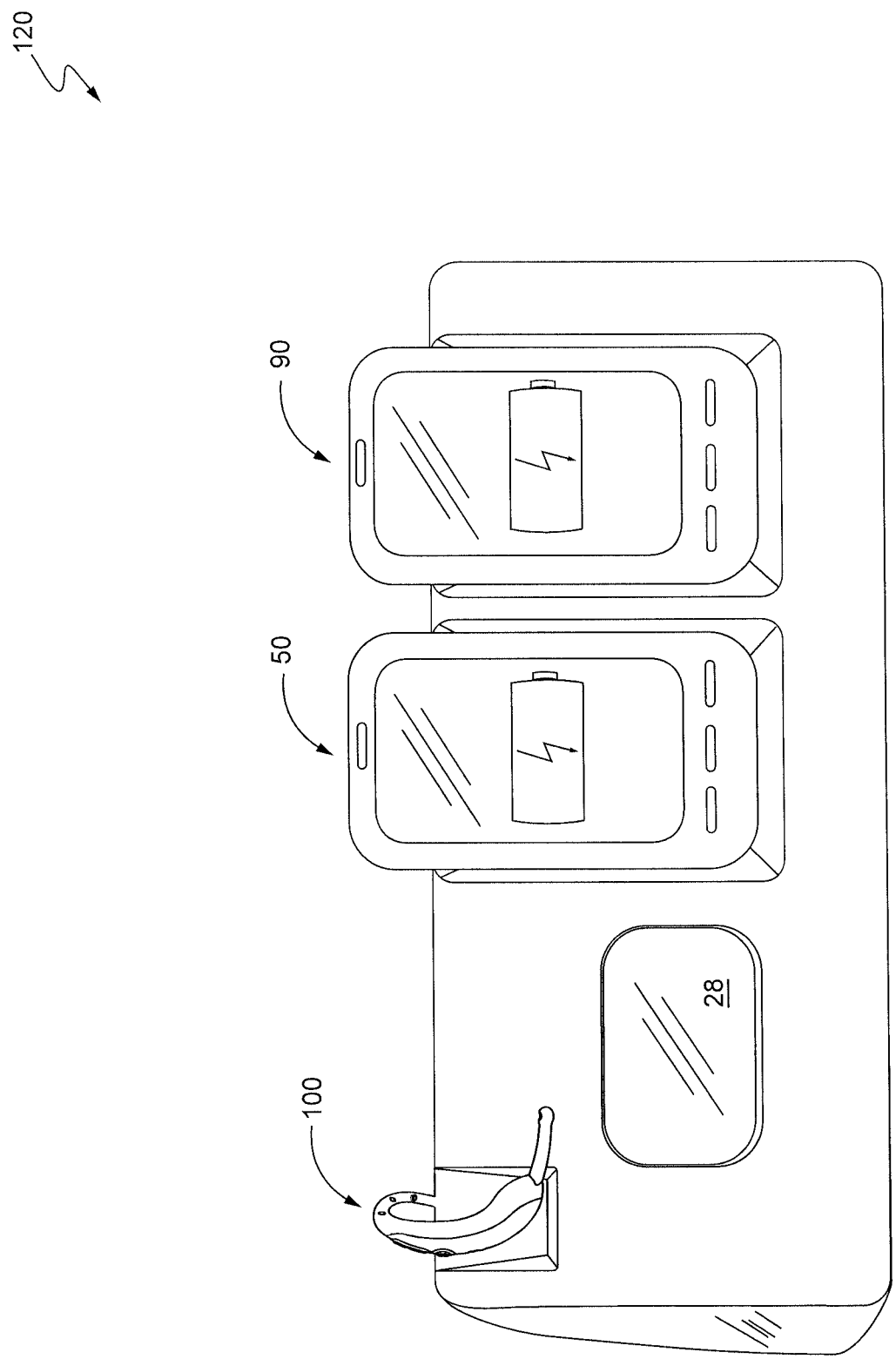
FIG. 6 is a perspective view of a battery charger configured to charge multiple consumer electronic devices and to calibrate their respective sensors according to one embodiment of the present invention.

As stated above, the present invention is not limited to the use of wireless charging platforms, but rather, may also configure other types of battery chargers to send and receive sensor calibration values to and from a variety of different electronic devices. FIG. 6 illustrates one embodiment in which the charger base comprises a charging station 120 configured to charge the batteries of one or more electronic devices, such as cellular telephones 50, 90, and/or headset 100, as well as to set one or more sensor calibration parameters of the sensors at these devices, as previously described.

As seen in FIG. 6, the cellular telephones 50, 90 and the wireless headset 100 are in operative charging contact with the charging station 120 (i.e., each device is electrically coupled to the charging station 120) via a respective charging receptacle or charging bay in the charging station 120. Particularly, each receptacle in charging station 120 includes a male electrical connector or other interface sized to couple to a corresponding female system interface connector on the devices 50, 90, 100. When the devices 50, 90, 100 are in the charging station 120 (by themselves or together), their batteries are charged. Additionally, in accordance with one embodiment of the present invention, one or more of the devices 50, 90, 100 also receive reference calibration values while in operative charging contact with the charging station 120 to use in setting the sensor calibration values of their respective sensors 62, 92, 102. A user I/O interface 28 may be included to allow a user to interface with the charging station 120 as previously stated.

Figure 7:
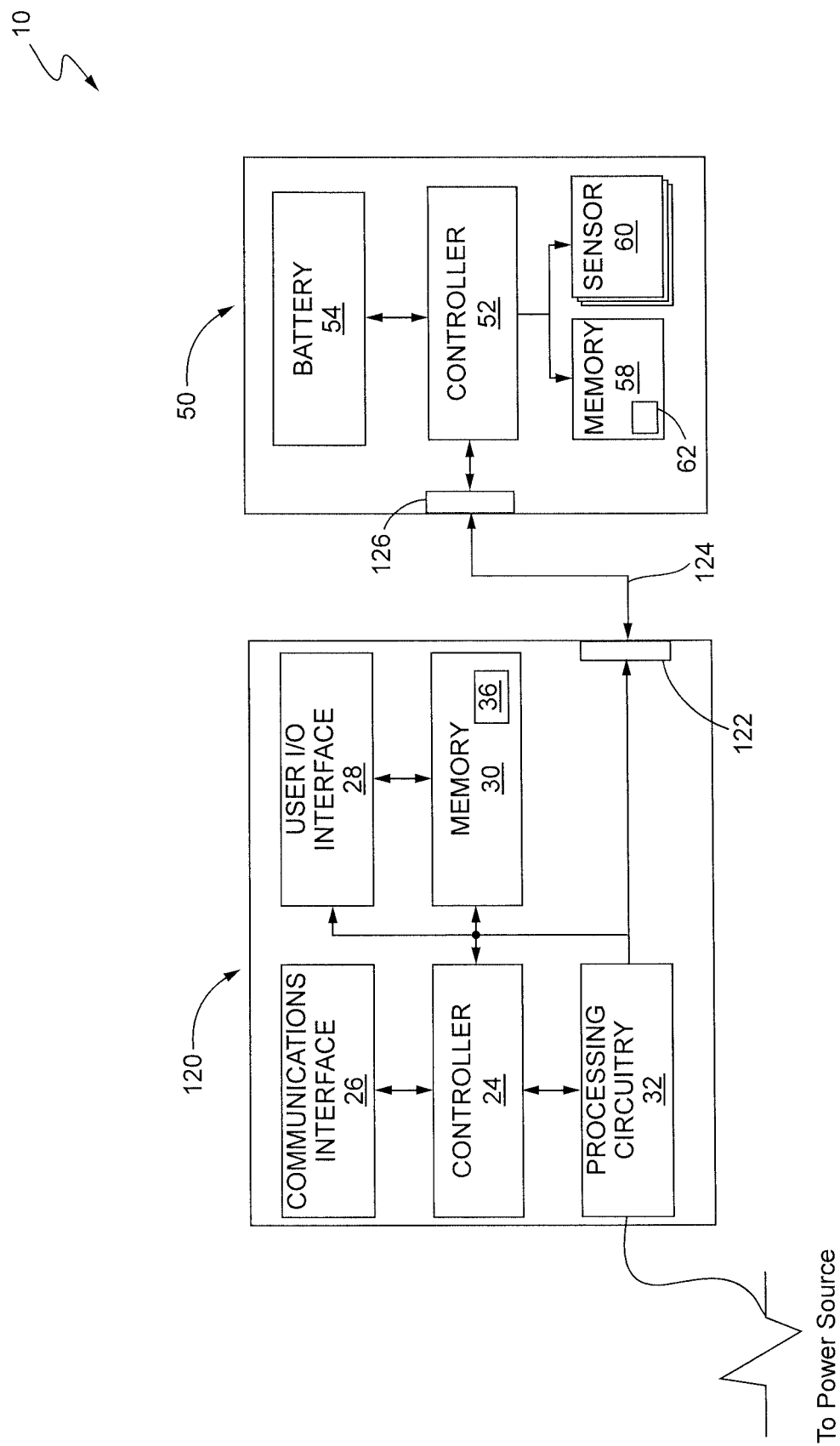
FIG. 7 is a block diagram illustrating some of the components of a battery charging system configured according to another embodiment of the present invention.

FIG. 7 is a block diagram illustrating some of the components in an exemplary charging station 120 configured according to one embodiment of the present invention. As seen in FIG. 7, the charging station 120 comprises many of the same types of components previously described with respect to the wireless charger 20. These include programmable controller 24, network communications interface 26, user Input/Output (I/O) interface 28, memory 30, and processing circuitry 32. Each of these components are configured to function similarly to those components previously described, and thus, are not described in further detail here. However, where the wireless charger 20 included a transceiver 34 to wirelessly communicate sensor reference and calibration values to/from the devices, charging station 120 includes an interface connector 122 that electrically couples to a corresponding system interface connector 126 disposed on the device being charged (e.g., cellular telephone 50). The electrical coupling may comprise a direct connection, or a cable 124 that connects the device to the charging station 120. In operation, the charging station 120 charges the battery 54 in the cellular telephone 50 (or other device). Additionally, while the cellular telephone 50 is in operative charging contact with the charging station 120, the sensor calibration function 36 associated with charging station 120 controls the charging station 120 to send a reference calibration value to the cellular telephone 50 to set a sensor calibration value of sensor 60, as previously described.

The present invention may, of course, be carried out in other ways than those specifically set forth herein without departing from essential characteristics of the invention. For example, the figures illustrate the sensor calibration parameters as comprising parameters for a sensor. However, this is for illustrative purposes only. As previously stated, the present invention may also send the reference values to a device to calibrate one or more sensor algorithms at the device that use the data output by the sensor.

Additionally, the previous embodiments illustrate the consumer electronic devices as being Smartphones or headset accessories. However, those skilled in the art will appreciate that other devices having sensors, such as watches, glasses, and smart clothing, are also suitable. Further, the consumer electronic devices may include any type and number of sensors. For example, in other embodiments, the sensors in such electronic devices may include magnetometers, accelerometers, compasses, or gyroscopes, and be used to facilitate the functions in gaming or medical applications.

Additionally, the base unit need not comprise a charging station or charging as described in the previous embodiments. Rather, the base unit may comprise any type of station or dock in which a user of a consumer electronic device having a sensor is apt to place the device from time-to-time. Such a station may or may not include charging circuitry to charge a battery at the consumer electronic device. One example of such a station is a media dock 130 seen in FIG. 8. The media dock includes an interface 132 that connects to the interface 56 on cellular telephone 50. When connected, the cellular telephone 50 is communicatively coupled to the media dock 130 and allows media files, such as music, stored in memory on device 50 to be rendered through a loudspeaker 134.

Like the previous embodiments, the media dock 130 also includes a controller 136, memory 138, and a sensor calibration function 36. While dock 130 is communicatively coupled to the cellular telephone 50, the sensor calibration function 36, which is executed by controller 136, may send a sensor calibration value to the cellular telephone 50 to set a sensor calibration parameter of a sensor at the cellular telephone 50. The calibration values sent to cellular telephone 50 may be retrieved from other consumer electronics devices that are coupled to dock 130 from time-to-time, retrieved from memory 138, input by the user via a user interface, or retrieved from a server in a communications network, for example. Therefore, the present embodiments are to be considered in all respects as illustrative and not restrictive, and all changes coming within the meaning and equivalency range of the appended claims are intended to be embraced therein.

What is claimed is:

1. A method comprising:
   detecting, by a wireless charging platform, each of a first electronic device and a second electronic device while both are positioned on a charging surface of the wireless charging platform, the first and the second electronic devices each comprising a battery and a sensor;
   communicatively coupling each of the first and the second electronic devices via respective wireless communications to the wireless charging platform;
   receiving, by the wireless charging platform, identification data comprising information identifying the first and the second electronic devices and the respective sensors of each of the first and second electronic devices;
   reading, by the wireless charging platform, a current reference calibration value associated with the sensor of the second electronic device;
   storing the current sensor reference calibration value in the wireless charging platform; and
   determining, by the wireless charging platform, the current sensor reference calibration value is applicable to the sensor of the first electronic device and setting a sensor calibration parameter of the sensor in the first electronic device based on the stored current reference calibration value while wirelessly charging the battery of the first electronic device.

2. The method of claim 1 wherein setting the sensor calibration parameter of the sensor in the first electronic device comprises sending the stored current reference calibration value to the first electronic device.

3. The method of claim 2 further comprising the wireless charging platform wirelessly transmitting the stored current reference calibration value to the first electronic device via a wireless communications link.

4. The method of claim 2 further comprising the wireless charging platform receiving the current reference value as user input.

5. The method of claim 2 further comprising the wireless charging platform:
receiving data transmitted by the first electronic device while the first electronic device is communicatively coupled to the wireless charging platform; and
obtaining the current reference calibration value based on the received data.

6. The method of claim 5 wherein obtaining the current reference calibration value based on the received data comprises the wireless charging platform retrieving the current reference calibration value from a memory at the wireless charging platform.

7. The method of claim 5 wherein obtaining the current reference calibration value further comprises the wireless charging platform retrieving the current reference calibration value from a network server via a communications interface at the wireless charging platform.

8. The method of claim 1 wherein the setting the sensor calibration parameter of the sensor in the first electronic device comprises sending the stored current reference calibration value to the first electronic device.

9. The method of claim 1 wherein the identification data comprises at least one of a mobile equipment identifier (MEI), a telephone number, and an identifier associated with the sensor.

10. A wireless charging platform comprising:
a base, comprising a charging surface, configured to:
receive first and second electronic devices on the charging surface, the first and the second electronic devices each comprising a battery and a sensor;
detect both the first and the second electronic devices while both are positioned on the charging surface;
communicatively couple to each of the first and the second electronic devices via respective wireless communications to the charging platform;
receive identification data comprising information identifying the first and the second electronic devices and the respective sensors of each of the first and second electronic devices; and
charge the batteries of the first and second electronic devices while the first and the second electronic devices are positioned on the charging surface; and
a processor circuit and a memory configured to:
read a current reference calibration value associated with the sensor in the second electronic device from the second electronic device;
store the current reference calibration value in the memory;
determine the current reference calibration value is applicable to the sensor of the first electronic device and set a sensor calibration parameter of the sensor in the first electronic device based on the stored current reference calibration value while the base is wirelessly charging the battery of the first electronic device.

11. The wireless charging platform of claim 10 wherein the processor circuit is configured to set the sensor calibration parameter of the sensor in the first electronic device by sending the stored current reference calibration value from the memory to the first consumer electronic device.

12. The wireless charging platform of claim 11 further comprising a wireless transceiver, and wherein the processor circuit is further configured to transmit the stored current reference calibration value to the first electronic device via the wireless transceiver.

13. The wireless charging platform of claim 11 further comprising a user interface configured to receive the current reference calibration value as user input.

14. The wireless charging platform of claim 11 wherein the processor circuit is further configured to:
receive data transmitted by the first electronic device; and
obtain the current reference calibration value based on the received data.

15. The wireless charging platform of claim 14 further comprising a communications interface connecting the charging base to a network server, and wherein the processor circuit is further configured to retrieve the current reference calibration from the network server.

16. The wireless charging platform of claim 10 wherein the identification data comprises at least one of a mobile equipment identifier (MEI), a telephone number, and an identifier associated with the sensor.

* * * * *